United States Patent [19]

Marosi et al.

[11] 3,911,088
[45] Oct. 7, 1975

[54] PROCESS FOR THE MANUFACTURE OF CRYSTALLINE BERYLLOALUMINOSILICATES

[75] Inventors: Laszlo Marosi, Ludwigshafen; Willi Ripperger, Frankenthal; Matthias Schwarzmann, Limburgerhof, all of Germany

[73] Assignee: BASF Aktiengellschaft, Ludwigshafen (Rhine), Germany

[22] Filed: Nov. 15, 1973

[21] Appl. No.: 415,840

[30] Foreign Application Priority Data
Nov. 17, 1972 Germany............................ 2256450

[52] U.S. Cl................ 423/329; 423/328; 252/455 Z
[51] Int. Cl.².......................................... C01B 33/28
[58] Field of Search.................... 423/328, 329, 330; 252/455 Z

[56] References Cited
UNITED STATES PATENTS
3,322,690   5/1967   Bilisoly............................ 252/455 Z
3,328,119   6/1967   Robson............................... 423/328
3,365,272   1/1968   Cornelius et al.................... 423/329
3,431,219   3/1969   Argauer........................... 423/329 X

OTHER PUBLICATIONS

Ueda et al., Molecular Sieve Zeolites–I, Advances in Chemistry Series, Am. Chem. Soc., 1971, pages 135–139.

Primary Examiner—Edward J. Meros
Attorney, Agent, or Firm—Johnston, Keil, Thompson & Shurtleff

[57] ABSTRACT

Berylloaluminosilicates having faujasite structure are described. These beryllium zeolites (Y-zeolites) can have substantially higher $Al_2O_3/SiO_2$ ratios than the berylliumfree aluminosilicates of similar structure; they can be obtained hydrothermally from aqueous mixtures of the components and can be used instead of the faujasites in industrial processes involving absorption or catalysts.

2 Claims, No Drawings

PROCESS FOR THE MANUFACTURE OF CRYSTALLINE BERYLLOALUMINOSILICATES

The present invention relates to synthetic crystalline berylloaluminosilicates which are to be classified under the structural type of the faujasites (Y-zeolites), and to processes for their manufacture.

Zeolites have become of great commercial importance amongst aluminosilicates. During the last decade, zeolites have become important in industry as ion exchangers, molecular sieves and catalysts. Amongst other applications, they are employed as selective absorbents for hydrocarbons and water or as catalysts for the catalytic and hydrogenating cracking of hydrocarbons, or as supports for active metals. The properties of zeolites, and especially their ability to act as ion exchangers, as materials with molecular sieve properties, or as catalysts, depend on their structure. Zeolites are built up of $SiO_4$ and $AlO_4$ tetrahedra linked three-dimensionally by oxygen atoms. This gives a three-dimensional lattice with cavities of a certain size. These cavities contain molecules of water and also cations which saturate the electrovalency of the $AlO_4$ tetrahedra.

The cations present in the cavities, for example alkali metal cations or alkaline earth metal cations, are replaceable and can be exchanged for other cations by the use of conventional ion exchange processes. It is possible to activate zeolites by heating them to temperatures at which the water of crystallization held in the cavities is released. After such activation, the zeolites are capable of selectively adsorbing gases and liquids.

Aluminosilicates having zeolite structure are to be found widely in nature. Zeolites are classified on the basis of structural differences into various categories which have been named after naturally occuring materials in these categories (analcime, natrolite, that is to say feldspathoids, chabazite, philippsite, heulandite, mordenite and faujasite). As long ago as 1937, but particularly since 1946, it has proved possible to manufacture synthetic zeolites by hydrothermal methods, based on systematic investigations of the $Na_2O/Al_2O_3/SiO_2/H_2O$ system.

Thus, for example, German Printed Specification 1,203,239 describes a process for the manufacture of synthetic molecular sieves, so-called Y-zeolites, which are structurally related to faujasite. The general empirical formula given for the Na versions of these Y-zeolites, which crystallize in the cubic system, is $0.9 \pm 0.2\ Na_2O : Al_2O_3 : WSiO_2 : XH_2O$, where W can assume values above 3 and up to 6 and X denotes a number up to about 9.

Such Y-zeolites, as well as X-zeolites (the latter type can be formed if the molecular ratio of $Al_2O_3$ to $SiO_2$ in the above empirical formula is less than 3) have been employed in numerous modifications in catalytic processes.

As has already been mentioned, an important characteristic of zeolitic aluminosilicates is that their properties can be modified by ion exchange. Thus it is possible, for example, to produce the H-form or $NH_4$-form of a zeolite from the Na-form which is preferentially produced when manufacturing the zeolite. It is also possible to replace the alkali metal by alkaline earth metals such as magnesium, by heavy metals or by rare earth metals, for example lanthanum or cerium. However, the changes in the properties of zeolites achievable by ion exchange alone are frequently restricted to narrow limits because ion exchange cannot significantly change the zeolite lattice and hence the properties of this lattice. Thus, for example, the cracking of hydrocarbons requires an acidic internal surface. The acid centers are produced by replacing the cations by protons. The acidity thus achievable depends particularly on the structure of the zeolite. With most zeolites, it is substantially determined by their composition and cannot therefore be changed significantly. Attempts have therefore been made to modify the zeolite lattice. This can be achieved by replacing the elements silicon and aluminum, which are essential to the lattice, by other elements. Thus, a publication of R. M. Barrer et al, J. Chem. Soc., Lodon, 1959, pages 195 —208, discloses the partial or complete replacement of aluminum and silicon in aluminosilicates by gallium and germanium. This gives alumino-germanates, gallosilicates or, if both constituents of the lattice are replaced completely, gallogermanates, whcih are structurally classifiable with the zeolites and by virtue of their special properties broaden the range of zeolites.

German Published Applications Nos. 1,959,241, 2,034,266, 2,034,267 and 2,034,268 describe synthetic crystalline zeolites which contain phosphorus in addition to aluminum and silicon. In these aluminosilicophosphates, phosphorus replaces silicon isomorphously, that is to say the three-dimensional lattice structure results from $AlO_4$, $SiO_4$ and $PO_4$ tetrahedra which are linked by oxygen atoms. As a result of the substitution of phosphorus for silicon in the crystal lattice (that is to say in the tetrahedra), crystallographic examination shows a reduction in the lattice constant. In addition to the crystallographic findings, IR spectroscopy also provides proof that silicon has been replaced by phosphorus. The substituted zeolites mentioned are capable of ion exchange, like their parent substances, and can be activated analogously by heating. However, they display advantages over the parent substances of the same series, in several respects. Thus, for example, it is reported that the heat stability of the aluminosilicophosphates is greater than that of aluminosilicates. The preparation of substituted aluminosilicates is however generally more difficult than that of pure aluminosilicates since uncontrollable side reactions frequently occur.

In considering prior to replace aluminum or silicon in aluminosilicates, it is found that only elements of main groups 3, 4 and 5 of the periodic table have been used. If aluminum is replaced by gallium or silicon is replaced by germanium, there is no change with regard to the lattice/cavity electrovalency. If silicon is replaced by phosphorus, the negative charge of the lattice is reduced; hence, in total fewer cations can be incorporated into the cavities of the three-dimensional network.

It was not to be expected, from prior information on zeolites, that on replacing trivalent aluminum or tetravalent silicon by divalent beryllium, the associated additional negative charge of the three-dimensional lattice would be capable of compensation by further occlusion of cations in the cavities. In particular all that would have been expected from the tolerance limits $(0.9 \pm 0.2\ Na_2O..)$ as shown by the empirical formula for zeolites of the Y type was that at most 10 mole% of beryllium would be capable of incorporation into this lattice without imposing additional load on the lattice.

Against this, we have now found, surprisingly that berylloaluminosilicates having a zeolite structure and containing more than 10 mole per cent of beryllium, preferably 20 to 50 mole per cent of beryllium, relative to the aluminum, can be manufactured. These zeolites are obtained by adding sodium beryllate to a reaction mixture consisting of an aluminum component and a silicon component. When doing so it is found, surprisingly, that the molar ratio $SiO_2$: $Al_2O_3$ in the berylloaluminosilicates, hereinafter referred to as beryllium zeolites, is greater than in the case of the pure aluminosilicates manufactured under the same reaction conditions (compare Examples 5 and 6).

The object of the invention is crystalline berylloaluminosilicates. These are characterized by having the molar composition $X\ M_{2/n}O . Al_2O_3 . A\ SiO_2 . Z\ BeO . W\ H_2O$, where M is a replaceable cation and n the valency thereof and the coefficients have the following numerical values:

$X = 1$ to $1.6$; $Y = 3$ to $7$; $Z = 0.01$ to $0.5$ and $W = 0$ to $9$. In addition, the berylloaluminosilicates are characterized by an X-ray diffraction pattern displacing at least the following d-spacings in Å:

| hkl | from | d | to | Intensity |
|---|---|---|---|---|
| 111 | 14.37 | — | 14.15 | very strong |
| 220 | 8.80 | — | 8.67 | medium |
| 311 | 7.50 | — | 7.39 | medium |
| 331 | 5.71 | — | 5.62 | strong |
| 331, 511 | 4.79 | — | 4.72 | medium |
| 440 | 4.46 | — | 4.33 | medium |
| 533 | 3.79 | — | 3.74 | strong |
| 642 | 3.33 | — | 3.28 | strong |
| 733 | 3.04 | — | 3.00 | medium |
| 822, 660 | 2.93 | — | 2.89 | medium |
| 751, 555 | 2.87 | — | 2.83 | strong |
| 840 | 2.78 | — | 2.74 | medium |
| 664 | 2.65 | — | 2.61 | medium |
| 10,2,2; 666 | 2.39 | — | 2.36 | medium |

The invention also relates to a process for the manufacture of crystalline berylloaluminosilicates. In this process a mixture of the molar composition $BeO/Al_2O_3 = 0.01 - 0.5$
$SiO_2/Al_2O_3 = 6 - 30$
$Na_2O/SiO_2 = 0.2 - 0.6$
$H_2O/Na_2O = 30 - 70$ is prepared at room temperature and is left for 18 to 24 hours and then heated to temperatures in the range of 50° to 105°C until a solid crystalline product has formed; this product is then separated from the liquid, washed and dried.

The crystalline beryllium zeolites according to the invention having the following composition, expressed in molar proportions of the oxides:

$X . M_2 . O . Al_2O_3 . Y\ SiO_2 . Z\ BeO . W\ H_2O$.

In this formula, M is a replaceable cation and n is the valency thereof. Preferably, alkali metals, especially sodium, are used for the manufacture of beryllium zeolites. The coefficients in the empirical formula given above are positive numbers and in particular have the following values:

$X = 1$ to $1.6$, $Y = 3$ to $7$, $Z = 0.01$ to $0.5$, preferably $0.2$ to $0.5$ and $W = 0$ to $9$.

The structure of beryllium zeolites resembles the structure of the mineral faujasite. The d-values of the X-ray diffraction diagram can be ascribed to a cubic unit cell. The lattice constants are 24 to 25 Å. The dimensions of the unit cell depend on the beryllium contents of the zeolite and can lie within the range indicated above, with hither beryllium contents resulting in a lower lattice constant of the beryllium zeolite. Table 1 shows the evaluation of an X-ray diagram of a typical beryllium zeolite. Table 1 lists important and characteristic d-spacings of a beryllium zeolite. It should be noted that the d-values, like the corresponding intensities, depend on the beryllium and aluminum contents of the zeolite and hence the values given in Table 1 for an example of a beryllium zeolite do not apply, in this form, to all beryllium zeolites. It is assumed that the substitution of beryllium takes place by one of the following mechanisms:

1. $2(AlO_2)^- = (BeSiO_4)^{2-}$
2. $(AlO_2)^- = (BeO(OH))^-$

However, other reaction mechanisms which could take place simultaneously in the crystal are also conceivable. The analytical findings listed below show that beryllium is present in the beryllium zeolites proposed in the present invention, and that the beryllium replaces aluminum:

1. The crystallinity, determined by X-ray methods, of the beryllium zeolites which have been produced as described in Examples 1 to 4, is in every case 100%.

2. Investigations using electron microscopy have shown that the beryllium zeolites contain no amorphous impurities.

3. The following considerations prove that beryllium has been incorporated into the zeolite lattice: It is known that the lattice constants of faujasite and of synthetic zeolites of the faujasite type vary within relatively wide limits, depending on the number of aluminum atoms in the unit cell. The variation of the lattice constant with the composition of the unit cell can be represented by the following equation:

$$a_0 = \frac{192\ b}{1 + (N_{Si}/N_{Al})} + C$$

where $b$ and $C$ are constants, $b$ being 0.00868 and $C$ being 24.191 (compare Breck and Flanigen, Molecular Sieves, published by the Society of Chemical Industry, London, 1968, pages 53 et seq.)

By means of this equation, the expected value of the lattice constant $a_0$ can be calculated from the known chemical analysis. It is found that the lattice constant of zeolites containing beryllium is always smaller than the expected value which can be calculated from equation 1 and the known Si/Al molar ratio, whilst with zeolites free of beryllium good agreement is found between the experimentally determined lattice constants and the values calculated from the above equation. This finding is also very plausible since the beryllium ion is approximately of the same size as the silicon ion.

There is further proof that beryllium is involved in the reaction which occurs in manufacturing the berylloaluminosilicate and becomes incorporated into the zeolites. The molar ratio of $SiO_2/Al_2O_3$ in zeolites containing beryllium is always greater than in zeolites free of beryllium but manufactured under the same reaction conditions. This is especially illustrated by Example 5. Hence, molar ratios of $SiO_2/Al_2O_3$ of 6 or more can be achieved with beryllium zeolites.

This is surprising. Admittedly, the patent literature on unsubstituted aluminosilicates, namely Y-zeolites, records that the molar ratio $SiO/Al_2O_3$ can assume values of 3 to 6 (compare German Printed application No.

1,203,239). In fact, however, the Examples described in this printed application only refer to zeolites in which the maximum value of the molar ratio $SiO_2/Al_2O_3$ is 4.44. The difficulty of manufacturing aluminosilicates with molar ratios $SiO_2/Al_2O_3$ exceeding 5 is also apparent from German Published application No. 1,667,477, where molar ratios of at most 5.8 are achieved by special measured taken when manufacturing the zeolite; compare Examples 5 and 6. Data in support of the above comments are to be found in paragraphs 1 and 2 of page 3 of the cited application.

The beryllium zeolites are manufactured from aqueous mixtures which contain aluminum, silica, beryllium and cations which can be replaced. The molar composition of the above mixture must lie within quite specific limits in order that the desired zeolites of the Y-type, containing beryllium, should be produced hydrothermally.

The alkali metals, especially sodium, are preferred as replaceable cation. An aqueous solution of sodium beryllate is a particularly suitable source of beryllium. The sodium beryllate solution can be produced by digesting minerals containing beryllium, such as beryl. A solution obtained by alkaline digestion of beryl, a mineral which in addition to beryllium contains aluminum and silica, can be employed direct for the synthesis. The other reactants are preparations based on silica such as, for example, silica gel, silica sol, silicic acid and sodium silicate. Reactive aluminum oxides such as $\gamma$-$Al_2O_3$, or sodium aluminate, or aluminum hydroxides, in particular serve as the source of aluminum. The pH is preferably adjusted to the requisite value by means of alkali metal hydroxides which provide the replaceable cations.

The reactants are mixed in cold water and then subjected to a hydrothermal treatment until crystallization occurs. To obtain solid crystalline beryylium zeolites which crystallographically are of the faujasite type (Y-type), the reaction mixture should have the following composition (all the data being expressed in molar ratios of the oxides):

$BeO/Al_2O_3 = 0.05$ to $0.5$
$SiO_2/Al_2O_3 = 6$ to $30$
$Na_2O/SiO_2 = 0.2$ to $0.6$
$H_2O/Na_2O = 30$ to $70$ .

Reaction mixtures having the following composition, based on molar ratios of the oxides, have proved particularly advantageous for the manufacture of beryllium zeolites:

$BeO/Al_2O_3 = 0.05$ to $0.4$
$SiO_2/Al_2O_3 = 9$ to $15$
$Na_2 O/SiO_2 = 0.3$ to $0.5$
$H_2O/Na_2O = 30$ to $60$

The reactants mentioned are first mixed at room temperature and left thereat for about 18 to 24 hours. The temperature is then slowly raised to 70° – 80° whilst stirring. The mixture is kept at this temperature until it assumes a more liquid consistency. The temperature is then increased somewhat, preferably maintaining values between 95° and 105°C, until crystallization occurs. The crystals are isolated from the aqueous phase by filtration and are dried.

The beryllium zeolites obtained according to the invention, preferably in the alkali metal form and especially in the sodium form, can be subjected to ion exchange by treating them with aqueous solutions of monovalent, divalent, trivalent or tetravalent metals. It is particularly preferred to replace the alkali metal ions, especially sodium ions, by ammonium ions or hydrogen ions, resulting in the so-called ammonium form or H-form of the beryllium zeolites. These can then be converted into particularly reactive absorbents or catalysts by calcination.

The beryllium zeolites are particularly suitable for replacing pure aluminosilicates in known industrial absorption processes or catalytic processes. In such processes, they are distinguished by relatively greater heat stability. This is important especially when regenerating beryllium zeolites which have been used for catalytic purposes.

The manufacture of beryllium zeolites is explained in more detail in the Examples which follow.

The following starting materials were employed in the experiments described in the Examples:

1. $SiO_2$ sol
   A-sol containing 26.5% by weight of $SiO_2$
   B-sol containing 40% by weight of $SiO_2$
2. Technical-grade sodium aluminate 41% by weight of $Na_2O$, 54% by weight of $Al_2O_3$, 5% by weight of $H_2O$.
3. Technical-grade sodiumm hydroxide containing 77.5% by weight of $Na_2O$ and 22.5% by weight of $H_2O$.
4. Sodium beryllate solution, prepared from beryllium nitrate by precipitating beryllium hydroxide with the calculated quantity of sodium hydroxide and dissolving the washed beryllium hydroxide in sodium hydroxide. The molar composition of the solution was: 2.5 moles of BeO, 6 moles of $Na_2O$ and 53.9 moles of $H_2O$.
5. Sodium beryllate solution (used in Examples 5 and 6)
   4.25 g $BeO = 0.17$ mole
   21 g $Na_2O = 0.34$ mole
   74.75 g $H_2O = 4.15$ moles .

EXAMPLE 1

12 g of sodium hydroxide and 15.1 g of sodium aluminate (2.) were dissolved in 138 g of water and 13.4 ml of sodium beryllate solution (4.) were added to the clear solution. The mixture obtained was added to 200 g of sol A at room temperature, whilst stirring, and the whole was thoroughly stirred for 3 to 5 minutes. The composition of the reaction mixture obtained, expressed in molar ratios of the oxides, was:

$BeO/Al_2O_3 = 0.42$
$H_2O/Na_2O = 51$
$SiO_2/Al_2O_3 = 11$
$Na_2O/SiO_2 = 0.374$

The mixture was left to stand for 16 hours at room temperature, then heated to 80°C whilst stirring, and digested for 5 hours at this temperature until it had acquired a more fluid consistency. The temperature was then raised to 95°C and the mixture was kept at this temperature for a further 50 hours, until a crystalline product had formed. The crystalline product was filtered off, washed and dried. According to X-ray results, the product consisted to the extent of 100% of crystalline beryllium zeolite having a lattice constant $a_o = 24.576$ A (cubic Y-type). Analysis showed a $BeO/Al_2O_3$ molar ratio of 0.405, whilst the $SiO_2/Al_2O_3$ molar ratio was 6.20.

EXAMPLE 2

15 g of sodium hydroxide and 15.1 g of sodium aluminate (2.) were dissolved in 80 g of water. 13.4 ml of sodium berylate solution (4.) were added to the solution obtained. This mixture was added to 200 g of sol A at room temperature, whilst stirring, and the whole was thoroughly stirred for 3 to 5 minutes. The composition of the reaction mixture obtained, expressed in molar ratios of the oxides, was:

$BeO/Al_2O_3 = 0.42$
$H_2O/Na_2O = 37$
$SiO_2/Al_2O_3 = 11$
$Na_2O/SiO_2 = 0.42$

The mixture was left to stand for 16 hours at room temperature, then heated to 70°C whilst stirring, and digested for 7 hours at this temperature until it had acquired a more fluid consistency. Thereafter, the temperature was raised to 100°C and the mixture was kept at this temperature for a further 40 hours. The crystalline product which had formed after this time was filtered off, washed and dried. According to X-ray analysis it consisted to an extent of 100% of crystalline beryllium zeolite and had a lattice constant $a_o$ of 24.604 A (cubic, Y-tape). Analysis showed a $BeO/Al_2O_3$ molar ratio of 0.41, whilst the $SiO_2/Al_2O_3$ molar ratio was 5.75.

EXAMPLE 3

21.5 g of sodium hydroxide and 17 g of sodium aluminate (2.) were dissolved in 145 g of water. 6.7 ml of sodium beryllate solution (4.) were added to this solution. This mixture was added to 200 g of A-sol at room temperature, whilst stirring, and the whole was thoroughly stirred for 3 to 5 minutes. The composition of the reaction mixture obtained, expressed in molar ratios of the oxides, was:

$BeO/Al_2O_3 = 0.186$
$H_2O/Na_2O = 40$
$SiO_2/Al_2O_3 = 9.8$
$Na_2O/SiO_2 = 0.477$

The mixture was left to stand for 24 hours at room temperature, then heated to 90°C whilst stirring and kept for 57 hours at this temperature. The crystalline product was filtered off, washed and dried. According to X-ray findings, it consisted to the extent of 100% of crystalline beryllium zeolite; the X-ray reflections, as recorded by a counter tube, could be ascribed to a cubical Y-tape with $a_o = 24.721$ A. Analysis showed a $BeO/Al_2O_3$ molar ratio of 0.2, whilst the $SiO_2/Al_2O_3$ molar ratio was 4.06.

EXAMPLE 4

30 g of sodium hydroxide and 37.5 g of sodium aluminate (2.) were dissolved in 273 g of water. 20 ml of sodium beryllate solution (4.) were added to this solution. This mixture was added to 190 g of sol B at room temperature, whilst stirring, and the whole was thoroughly stirred for 3 to 5 minutes. The composition of the reaction mixture obtained, expressed in molar ratios of the oxides, was:

$BeO/Al_2O_3 = 0.25$
$H_2O/Na_2O = 31$
$SiO_2/Al_2O_3 = 6.4$
$Na_2O/SiO_2 = 0.58$

The mixture was left to stand for 50 hours at room temperature, then heated to 100°C whilst stirring and left at this temperature for a further 10 hours until crystallization started. The crystalline product was filtered off, washed and dried. According to X-ray findings, the product consisted to the extent of 100% of crystalline, cubic beryllium zeolite; the reflections recorded by a counter tube could be indexed by taking $a_o = 24.740 \pm 0.005$ A. Analysis showed a $BeO/Al_2O_3$ molar ratio of 0.22, whilst the $SiO_2/Al_2O_3$ molar ratio was 3.7.

EXAMPLE 5 a. 21.9 g of sodium aluminate (2.) and 13.1 g of sodium hydroxide were dissolved in 90 g of water and 25.8 ml of sodium beryllate solution (5) were added to this solution. This mixture was added to 250 g of silicon dioxide sol A at room temperature, whilst stirring, and the whole was stirred thoroughly.

b. In a parallel experiment, a beryllium-free reaction mixture was prepared from the same quantities of water, aluminate and sol. In order to use comparable starting mixtures, somewhat more NaOH and $H_2O$ than the quantity of 13.1 g mentioned in (a) was added to this mixture.

The reaction mixtures obtained from batches (a) and (b) had the following compositions, expressed in molar ratios of the oxides:

| (a) | | | (b) | | |
|---|---|---|---|---|---|
| $BeO/Al_2O_3$ | = | 0.51 | $BeO/Al_2O_3$ | = | — |
| $H_2O/Na_2O$ | = | 39 | $H_2O/Na_2O$ | = | 39 |
| $SiO_2/Al_2O_3$ | = | 9.5 | $SiO_2/Al_2O_3$ | = | 9.5 |
| $Na_2O/SiO_2$ | = | 0.39 | $Na_2O/SiO_2$ | = | 0.39 |

The mixtures were left to stand for 24 hours at room temperature, then heated to 95°C whilst stirring and kept at this temperature until crystallization started. Judging from the X-ray diagram, the samples consisted of well-crystallized zeolites. The analysis showed the following:

a. $BeO/Al_2O_3 = 0.395$
   $SiO_2/Al_2O_3 = 5.9$
   Lattice constant $a_o = 24,580$ A
b. $SiO_2/Al_2O_3 = 4.60$
   Lattice constant $a_o = 24.695$ A

EXAMPLE 6

15 g of sodium hydroxide and 18.8 g of sodium aluminate (2) were dissolved in 140 g of water and 15 ml of sodium beryllate solution (5) were added to the clear solution. The resulting solution was added to 250 g of sol A at room temperature and the mixture was thoroughly stirred for about 3 minutes. The composition of the reaction mixture thus obtained, expressed in molar ratios of the oxides, was:

$BeO/Al_2O_3 = 0.35$
$H_2O/Na_2O = 50$
$SiO_2/Al_2O_3 = 11$
$Na_2O/SiO_2 = 0.34$

The mixture was left to stand overnight at room temperature, then heated to 95°C whilst stirring and left at this temperature for 52 hours. The resulting crystalline product was filtered off, washed and dried. According to X-ray analysis, it consisted to the extent of 100% of crystalline beryllium zeolite (Y-type). The analysis showed the following:

$BeO/Al_2O_3 = 0.32$
$SiO_2/Al_2O_3 = 6.46$
Lattice constant $a_o = 24.569$ A

Table 1

| hkl | $h^2+k^2+l^2$ | d | Relative intensity |
|---|---|---|---|
| 111 | 3 | 14.20 | very strong |
| 220 | 8 | 8.70 | medium |
| 311 | 11 | 7.40 | medium |
| 331 | 19 | 5.65 | strong |
| 333, 511 | 27 | 4.72 | medium |
| 440 | 32 | 4.32 | medium |
| 531 | 35 | 4.15 | very weak |
| 620 | 40 | 3.88 | weak |
| 533 | 43 | 3.74 | strong |
| 711, 551 | 51 | 3.44 | weak |
| 642 | 56 | 3.28 | strong |
| 733 | 67 | 3.00 | medium |
| 822, 660 | 72 | 2.90 | medium |
| 751, 555 | 75 | 2.84 | strong |
| 840 | 80 | 2.74 | medium |
| 911, 753 | 83 | 2.70 | very weak |
| 664 | 88 | 2.61 | medium |
| 844 | 96 | 2.50 | very weak |
| 10,2,0; 862 | 104 | 2.40 | very weak |
| 10,2,2; 666 | 108 | 2.35 | medium |
| 10,4,0; 864 | 116 | 2.27 | very weak |
| 11,1,1; 775 | 123 | 2.21 | weak |
| 880 | 128 | 2.16 | medium |
| 11,3,1; 971, 955 | 131 | 2.14 | weak |
| 11,3,3; 973 | 139 | 2.08 | medium |
| 12,0,0; 884 | 144 | 2.04 | weak |

We claim:

1. A process for the manufacture of crystalline berylloalumino-silicates, wherein an aqueous solution of sodium beryllate is added to sodium hydroxide and sodium aluminate, dissolved in water, the resulting solution is added, while stirring, to a sol of $SiO_2$ to prepare at room temperature a mixture having the molar composition (beryllate calculated as BeO):

$BeO/Al_2O_3 = 0.01$ to 0.5
$SiO_2/Al_2O_3 = 6$ to 30
$Na_2O/SiO_2 = 0.2$ to 0.6
$H_2O/Na_2O = 30$ to 70 this mixture is left for 18 to 24 hours and then heated to temperatures within the range of 50° to 105°C until a solid crystalline product has formed, and this product is then separated from the liquid, washed and dried.

2. A process as claimed in claim 1 wherein said mixture has the molar composition:

$BeO/Al_2O_3 = 0.05$ to 0.4
$SiO_2/Al_2O_3 = 9$ to 15
$Na_2O/SiO_2 = 0.3$ to 0.5
$H_2O/Na_2O = 30$ to 60.

* * * * *